US005557154A

United States Patent [19]

Erhart

[11] Patent Number: 5,557,154

[45] Date of Patent: Sep. 17, 1996

[54] LINEAR ACTUATOR WITH FEEDBACK POSITION SENSOR DEVICE

[75] Inventor: Timothy A. Erhart, Chanhassen, Minn.

[73] Assignee: Exlar Corporation, Chanhassen, Minn.

[21] Appl. No.: 154,953

[22] Filed: Nov. 19, 1993

Related U.S. Application Data

[63] Continuation-in-part of Ser. No. 125,495, Sep. 22, 1993, Pat. No. 5,491,372, which is a continuation of Ser. No. 999,463, Dec. 29, 1992, abandoned, which is a continuation of Ser. No. 775,113, Oct. 11, 1991, abandoned.

[51] Int. Cl.[6] .............................. H02K 7/06; H02K 7/10; H02K 11/00; F04B 17/03

[52] U.S. Cl. ........................... 310/80; 310/68 B; 417/415

[58] Field of Search ............................ 310/80, 83, 68 B; 318/640, 687; 417/415, 416, 417

[56] References Cited

U.S. PATENT DOCUMENTS

| | | | |
|---|---|---|---|
| Re. 33,910 | 5/1992 | Compton | 318/687 |
| 511,679 | 12/1893 | Buckley | 74/424.8 |
| 2,683,379 | 7/1954 | Strandgren | 74/424.8 |
| 3,128,634 | 4/1964 | Eastman | 74/424.8 |
| 3,159,758 | 12/1964 | Hemperly, Jr. et al. | 310/83 |
| 3,406,584 | 10/1968 | Roantree | 74/424.8 |
| 3,595,094 | 7/1971 | Lemor | 74/89.14 |
| 3,660,704 | 5/1972 | Paine et al. | 310/80 |
| 4,276,003 | 6/1981 | Perkins et al. | 417/415 |
| 4,277,706 | 7/1981 | Isaacson | 310/80 |
| 4,337,671 | 7/1982 | Ulf | 74/424.8 |
| 4,493,614 | 1/1985 | Chu et al. | 417/415 |
| 4,521,707 | 6/1985 | Baker | 310/80 |
| 4,576,057 | 3/1986 | Saarl | 74/424.8 |
| 4,601,640 | 7/1986 | Sommer | 417/415 |
| 4,723,941 | 2/1988 | Thistle et al. | 417/415 |
| 4,964,314 | 10/1990 | Wilkes | 74/424.8 |
| 5,041,748 | 8/1991 | Huber | 310/80 |
| 5,053,685 | 10/1991 | Bacchi | 310/80 |
| 5,117,700 | 6/1992 | Trechsel | 74/89 |
| 5,192,001 | 3/1993 | Bianco | 417/415 |
| 5,312,233 | 5/1994 | Tanny et al. | 417/415 |
| 5,391,953 | 2/1995 | van der Veen | 310/80 |

FOREIGN PATENT DOCUMENTS

| | | | |
|---|---|---|---|
| 0053883 | 6/1982 | European Pat. Off. . | |
| 2668206 | 4/1992 | France . | |
| 3938353 | 5/1990 | Germany . | |
| 55-123380 | 9/1980 | Japan | 417/415 |
| 17392 | 5/1907 | Norway | 417/415 |
| 717396 | 2/1980 | U.S.S.R. | 417/417 |
| 2091375 | 7/1982 | United Kingdom | 74/424.8 |
| 9012962 | 11/1990 | WIPO . | |

OTHER PUBLICATIONS

*Minnac* product literature, Ross–Hime designs, Inc. (no date).

De Charette, *Comparing Ball and Roller Screws*, Machine Design, pp. 119–123 (Sep. 11, 1980).

Lemor, *Planetary Roller Screws—Expanding the limits of linear actuators*, Machine Design, pp. 69–72 (Feb. 25, 1988).

*SKF plantery and recirculating rollers screws* product literature (1990).

*Electric Linear Actuators & Controls* product literature, Industrial Devices Corporation (1990).

Patent Abstracts of Japan, vol. 8, No. 111 (E–246) (1548) 24 May 1984 & JP,A,59 025 543 (Sutaa Seiki) 9 Feb. 1984.

*Primary Examiner*—Clayton E. LaSalle

*Attorney, Agent, or Firm*—Merchant, Gould, Smith, Edell, Welter & Schmidt

[57] ABSTRACT

The present invention provides an electrically powered linear actuator. An elongated cylinder formed of a magnetic material and having an internally threaded bore is rotatably supported relative to the housing assembly. Magnets are mounted about an outer circumference of the cylinder to form an armature within the motor assembly. The thread engaging portion of the actuator assembly is moved along the threaded extent of the cylinder on rotation of the cylinder. Thus, the cylinder functions as an armature drive cylinder. The actuator assembly further includes a feedback position sensor. This sensor provides output shaft position location information to a controller which, in combination with a servo-amplifier, operates the linear actuator in a closed-loop feedback control environment. Further, such an 2— 20 65 260 235 265 165 175 190 160 45 60 50 215 240 220 25 70 55 80 195 30 225 245 85 170 30 205 200 230 233 210 175 2— 90 actuator can be utilized in precision volumetric pump applications. In a volumetric pump application, the output shaft of the actuator includes a cylinder head which travels within a cylinder. Two pump strokes may be defined as a first intake stroke (e.g., when the output shaft is retracted) and a second exhaust stroke (e.g., when the output shaft is extended). Valves are utilized to control the entry and exit of fluid and other materials to and from the pump.

16 Claims, 7 Drawing Sheets

20
100 80 30 55
110
25
85
120
125
126
126
30

LINEAR ACTUATOR WITH FEEDBACK POSITION SENSOR DEVICE

This application is a continuation-in-part of U.S. Ser. No. 08/125,495 filed Sep. 22, 1993, now U.S. Pat. No. 5,491, 372; which was a continuation of U.S. patent application Ser. No. 07/999,463, filed Dec. 29, 1992, now abandoned; which was a continuation of U.S. patent application Ser. No. 07/775,113 filed Oct. 11, 1991, now abandoned.

FIELD OF THE INVENTION

The present invention relates to linear actuators and, in particular, to an electrically powered liner actuator with a feedback position sensor device. The present invention can also optionally include a volumetric pump.

BACKGROUND OF THE INVENTION

Devices which provide a reciprocating motion through an actuator member as that member is moved through an actuation stroke are known in the prior art. Such actuators may be fluid powered—hydraulically or pneumatically—or electrically powered. An advantage to a hydraulic powered actuator is that it provides high linear forces in an extremely small packaging, typically cylinder/piston arrangement. Hydraulic systems, no matter how well maintained, leak fluid contributing to an ever growing environment problem. While achievable, computer control of a hydraulic cylinder actuator involves substantial complexity. Pneumatic driven actuators while clean are nearly impossible to place under electronic control due to air's compressibility.

An electric motor, which may be employed to develop the fluid power for the fluid systems described above, is a highly efficient and reliable system for delivering usable power. In the context of a fluid system, however, much of the efficiency is lost in the generation of the fluid power. Additionally, computer control of an electric motor is relatively simple. For this and other reasons mentioned above, the trend has been to directly link the rotating output shaft of an electric motor to a mechanical device which converts the rotational motion into reciprocal or linear motion. The most common method is to use a lead screw coupled directly to the motor output shaft with a follower unit traveling along the threads of the lead screw.

The motor/lead screw combination addressees some of the difficulties of a fluid powered system. However, at the point of application of the reciprocating motion, this combination requires considerably more space. Typical prior art arrangements also result in exposure of the threaded components and/or nonconcentric connection of the lead screw and follower assembly to the load.

An example of one prior art system is disclosed in U.S. Pat. No. 2,683,379 (Strandgren) in which a reciprocating member is enclosed by a threaded drive element. Typically, a motor assembly is coupled to an end of such a drive element contributing to the overall length of the actuator unit.

U.S. Pat. No. 3,660,704 (Paine et al.) discloses a motor concentrically mounted about a threaded drive element. This reduces the length of the actuator assembly unit in short stroke applications, and encloses the threads. However, it substantially lengthens the actuator in long stroke applications since a smooth section equal in length to the threaded section must be included in order for the actuator shaft to slide through the bushing.

In addition to providing a linear actuator which addresses the foregoing shortcomings, a need exists for a linear actuator apparatus and system which offers precise positioning control. Further, there also exists a need for a linear actuator including a volumetric pump method and apparatus.

SUMMARY OF THE INVENTION

The present invention provides an electrically powered, bi-directional linear actuator of relatively small size (length and diameter) in which the threads of the drive member and its follower are not exposed and where all force bearing components are concentrically connected to a load. The actuator includes an actuator assembly having an output shaft, an electric motor assembly (having a stator) and a housing assembly. An armature drive cylinder is formed as an elongated cylinder of a magnetic material and is rotationally supported relative to the housing assembly. The elongated cylinder has permanent magnets mounted about the circumference to form an armature within the motor assembly and has an internally threaded bore that forms a drive cylinder within the actuator assembly.

The output shaft of the actuator assembly is moved between retracted and extended positions by the electric motor assembly. Specifically, rotation of the armature drive cylinder under the influence of the stator's magnetic forces produces a corresponding rotation of the armature drive cylinder threaded bore. Engagement of the threads of the armature drive cylinder with those of the output shaft assembly provides a corresponding linear movement in the output shaft. The thread engaging portion of the actuator assembly is significantly shorter than the extent of the threaded bore of the armature drive cylinder with that difference in length defining a maximum actuation stroke of the actuator.

The actuator assembly further includes a feedback position sensor. This sensor provides output shaft position location information to a controller which, in combination with a servo-amplifier, operates the linear actuator in a closed-loop feedback control environment. Further, such an actuator can be utilized in precision volumetric pump applications. In a volumetric pump application, the output shaft of the actuator includes a cylinder head which travels within a cylinder. Two pump strokes may be defined as a first intake stroke (e.g., when the output shaft is retracted) and a second exhaust stroke (e.g., when the output shaft is extended). Check valves or positively actuated valves, such as pneumatic valves, may be utilized to control the entry and exit of fluid to and from the pump. The type of valves actually used will depend on the application and the required precision.

DETAILED DESCRIPTION OF THE PREFERRED EMBODIMENTS

Figure 1:
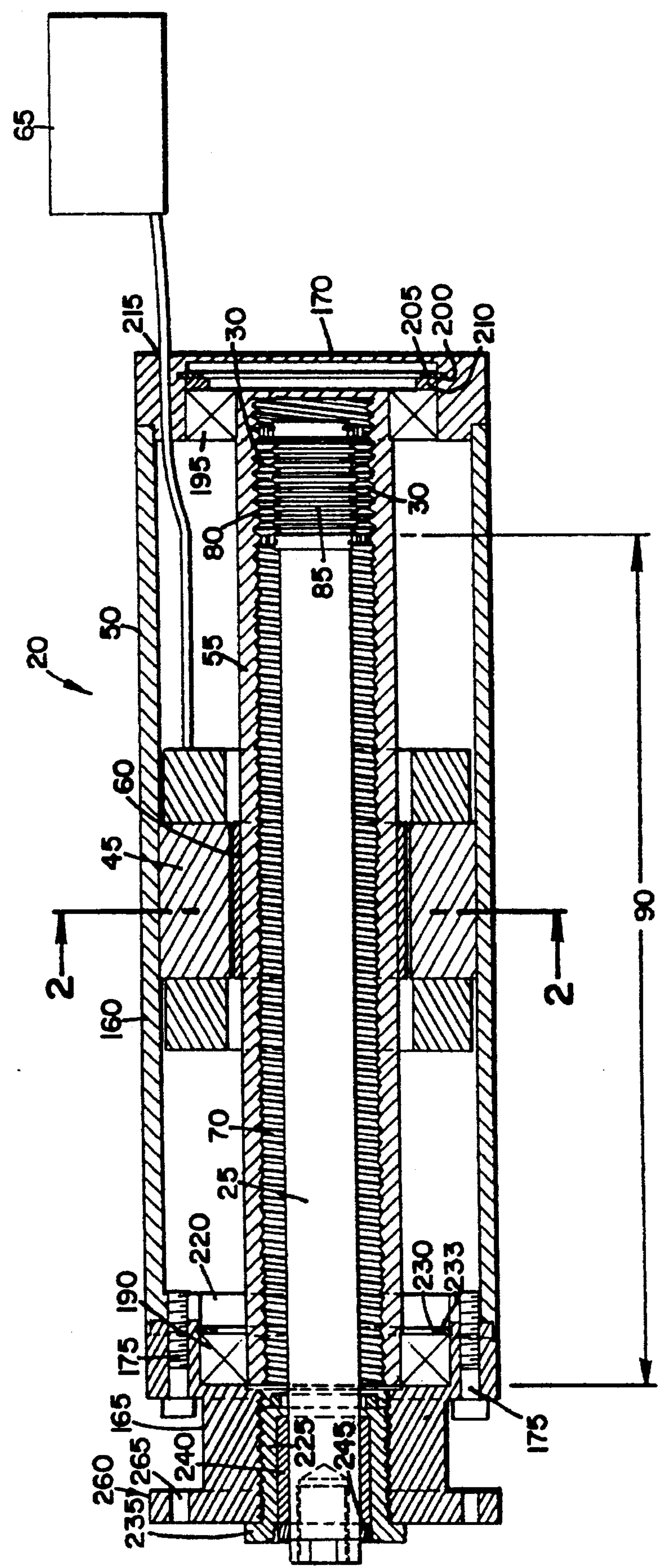
FIG. 1 is a sectional view along the axial length of a first embodiment of a linear actuator in accordance with the present invention.
Figures 2, 3:
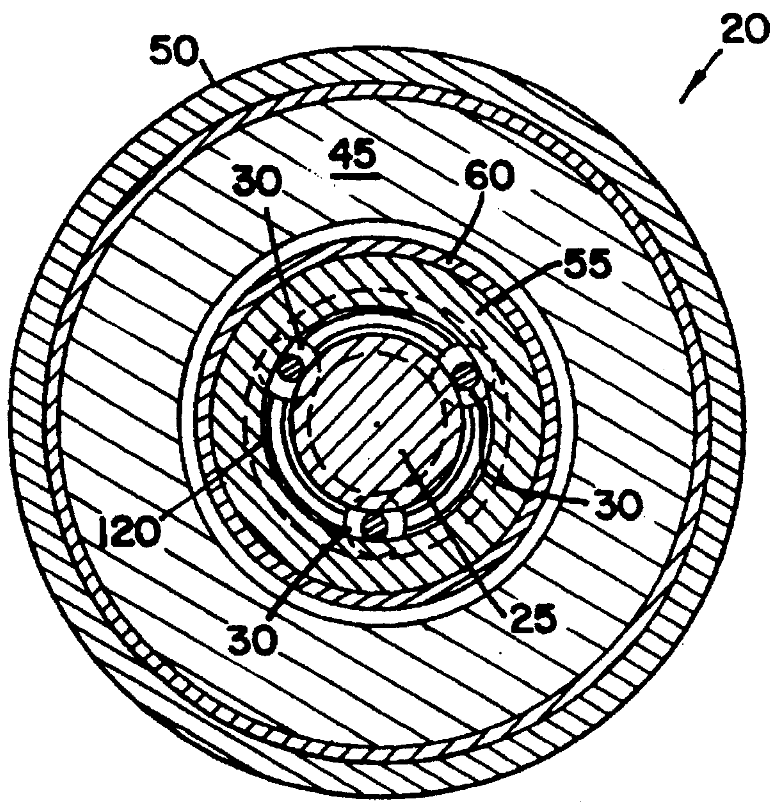
FIG. 2 is a sectional view as taken along line 2—2 of FIG. 1.
FIG. 3 is an enlarged detailed view of a portion of FIG. 1.

A preferred embodiment of a linear actuator in accordance with the present invention is shown in FIGS. 1–3 (designated generally at 20) and includes an actuator assembly (including an output shaft 25 and a plurality of transmission rollers 30), an electric motor assembly (including a stator 45) and a housing assembly 50. The motor assembly moves the output shaft 25 between a retracted position (shown in FIG. 1) and an extended position (not shown) and includes an elongated cylinder 55 formed of a magnetic material rotatably supported relative to the housing assembly 50. Magnets 60 are mounted about an outer surface of the cylinder 55 to form an armature (with the cylinder 55) within the motor assembly. The stator 45 is attached to and supported by the housing assembly 50 and encircles the cylinder 55. An external control 65, of any known type, selectively energizes the stator 45 to rotate the armature (clockwise or counterclockwise).

In order to more clearly describe the present invention, a description of the feedback control and volumetric pump will now be deferred pending a discussion of a preferred embodiment actuator assembly.

Actuator Assembly

The elongated cylinder 55 includes a central threaded bore 70 the threads of which are engaged by the transmission rollers 30. The output shaft 25 is coupled with the transmission rollers 30 to move along the threaded bore 70 on rotation of the cylinder 55. Thus, the elongated cylinder 55 forms a drive cylinder within the actuator assembly as well as forming the armature of the motor assembly. Accordingly, the elongated cylinder 55 is referred to herein as the armature drive cylinder.

The output shaft 25 and the transmission rollers 30 are axially aligned within the threaded bore 70 of the armature drive cylinder 55. The transmission rollers 30 are spaced around a portion of the output shaft 25 (see FIG. 2) and include annular ribs or rings 80 which extend along the axial extent thereof (see FIG. 3). The rings 80 define camming surfaces which are engaged by the threaded bore 70 of the armature drive cylinder 55 to move the actuator assembly along the threaded bore 70 in response to the rotation of the armature drive cylinder 55. The extent of threaded bore 70 within the armature drive cylinder 55 defines a track along which the transmission rollers 30 of the actuator assembly move.

A portion of the output shaft 25 includes annular rings 85 which are engaged by the annular rings 80 of the transmission rollers 30 to advance the output shaft 25. Thus, as described, when the armature drive cylinder 55 is selectively rotated (clockwise or counterclockwise) by the stator 45, the threaded bore 70 engages the annular rings 80 of the transmission rollers 30 to selectively move the transmission rollers 30 along the threaded extent 70 of the armature drive cylinder 55. The annular rings 80 of the transmission rollers 30 engages the annular rings 85 of the output shaft 25 to move the output shaft 25.

The thread engaging portion of the actuator assembly (as defined by the annular rings 80 of the transmission rollers 30) is significantly shorter than the extent of the internal threads within the armature drive cylinder 55 such that the difference between them defines a maximum actuation stroke 90. Since the extent of the thread engaging portion (annular rings 80 of the transmission rollers 30) is significantly small as compared to the extent of the threads within the armature drive cylinder 55 and since the motor assembly is positioned around the output shaft 25, the length of the cylinder 55 closely approximates the maximum extent of the actuation stroke 90 and the length of the actuator 20. Also, the thread engaging portion (annular rings 80 of the transmission rollers 30) and the annular rings 85 of the actuator assembly are maintained within the armature drive cylinder 55 during the entire actuation stroke 90. Thus, the interactive parts of that assembly are self-protected during the entire stroke of the actuator. In addition, since only a "smooth" portion of the output shaft 25 extends outside the threaded bore 70, a forward end of the bore 70 can be easily sealed to define a protected chamber for the interacting elements of the device.

As illustrated in FIG. 2, at least three transmission rollers are used. The transmission rollers 30 are mounted for rotation about the output shaft 25 and include forward and rear support axle extensions 110 and 110 which cooperate with forward and rear support rings 120 and 125, respectively (FIGS. 2 and 3). Each of the forward and rear support rings 120 and 125 include support holes 126 which accept one of the extensions 100, 110. The number of support holes 126 on each of the forward and rear support rings 120 and 125 corresponds to the number of transmission rollers 30. The forward support axle extensions 100 of each of the transmission rollers 30 extend through a support hole 126 of the forward support ring 120. Likewise, the rear support axles 110 of each of the transmission rollers 30 extend through a support hole 126 of the rear support ring 125. Thus, the forward and rear support rings 120 and 125 maintain the spacing of the transmission rollers 30 about the output shaft 25 during operation. The axle extensions 110 and 110 are secured within the holes 126 of support rings 120 and 125 in any known manner.

As shown in FIG. 1, the housing assembly 50 includes a cylindrical tube 160, an end cap 165, and a circular end seal 170. The end cap 165 is mounted to a first end of the cylindrical tube 160 by bolts 175 and the circular end seal 170 is mounted to a second end of the cylindrical tube 160, as by a proper fit.

The stator 45 of the motor assembly is mounted about an inner surface of the cylindrical tube 160. The armature drive cylinder 55 is rotationally supported relative to the housing assembly 50 by front and rear bearings 190 and 195, respectively. The rear support bearing 195 is mounted to an internal surface of the circular end seal 170 to rotationally support a rear portion of the armature drive cylinder 55. The circular end seal 170 includes a circumferential groove 200 within which is maintained a retaining ring 205. A bumper 210 is interposed and held in place between the retaining ring 205 and the bearing 195 to absorb energy when the actuator assembly reaches the retracted position at the rear end of the threaded bore 70 thereof. The circular end seal 170 includes a wire opening 215 for electrically connecting the external control 65 to the stator 45.

The end cap 165 is formed of a stepped cylindrical member having a stepped central bore defining a first bore portion 220 and a second bore portion 225, the diameter of the first bore portion 220 being larger than the diameter of the second bore portion 225. The front bearing 190 is mounted within the first bore portion 220 of the end cap 165 to rotationally support a front portion of the armature drive cylinder 55. The end cap 165 includes a circumferential groove 230 which maintains a front retainer ring 233 to secure the front bearing 190 relative to the housing assembly 50.

The second bore portion 225 of the end cap 165 is internally threaded. An externally threaded tubular bushing support 235 is seated within the internally threaded second bore portion 225 of the end cap 165. The bushing 240 is concentrically positioned within the bushing support 235 to support the output shaft 25 at a forward (output) end of the housing assembly 50. A ring seal 245 is included at a forward end of the bushing 240.

The end cap 165 includes a flange portion 260 having screw holes 265 for attachment to a mounting surface. The output shaft 25 is designed to receive an extension (not shown) and includes an internally threaded bore at an extended end.

Figure 4:
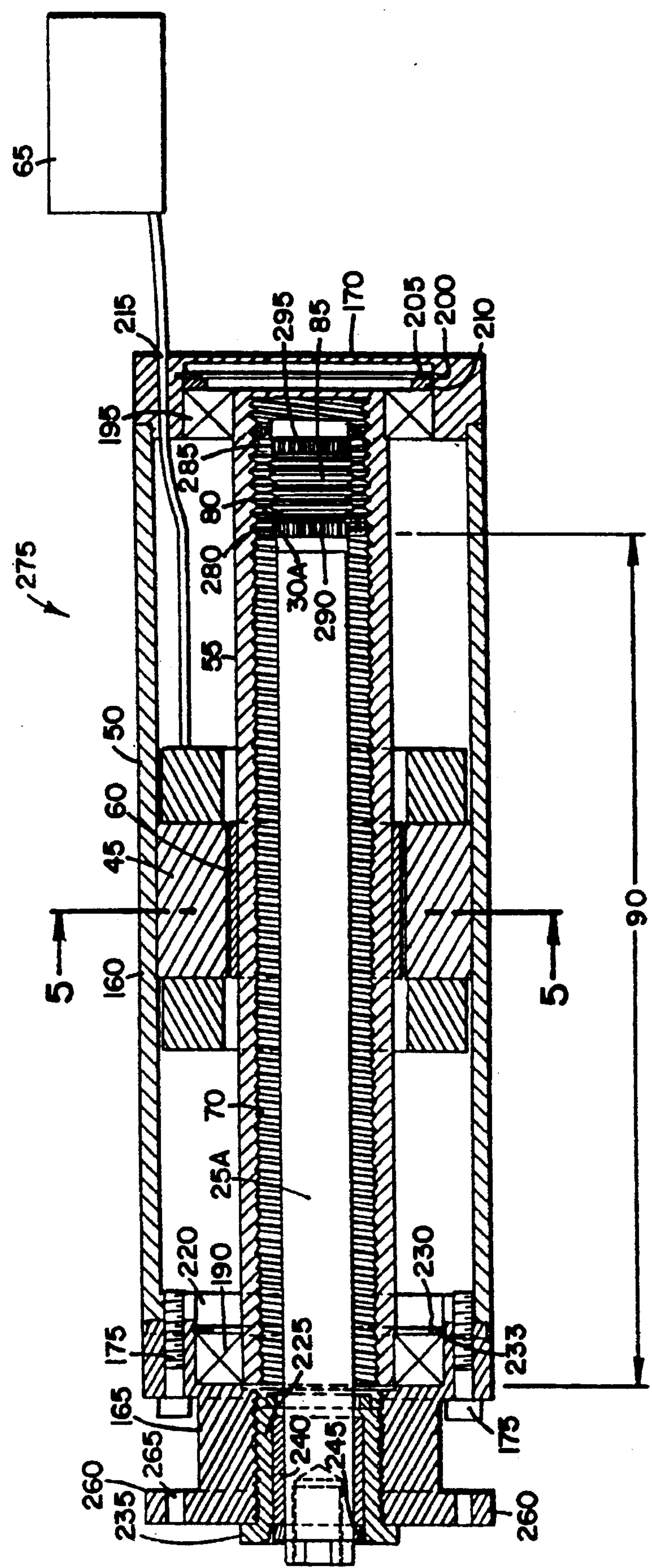
FIG. 4 is a sectional view along the axial length of another embodiment of a linear actuator in accordance with the present invention.
Figure 5:
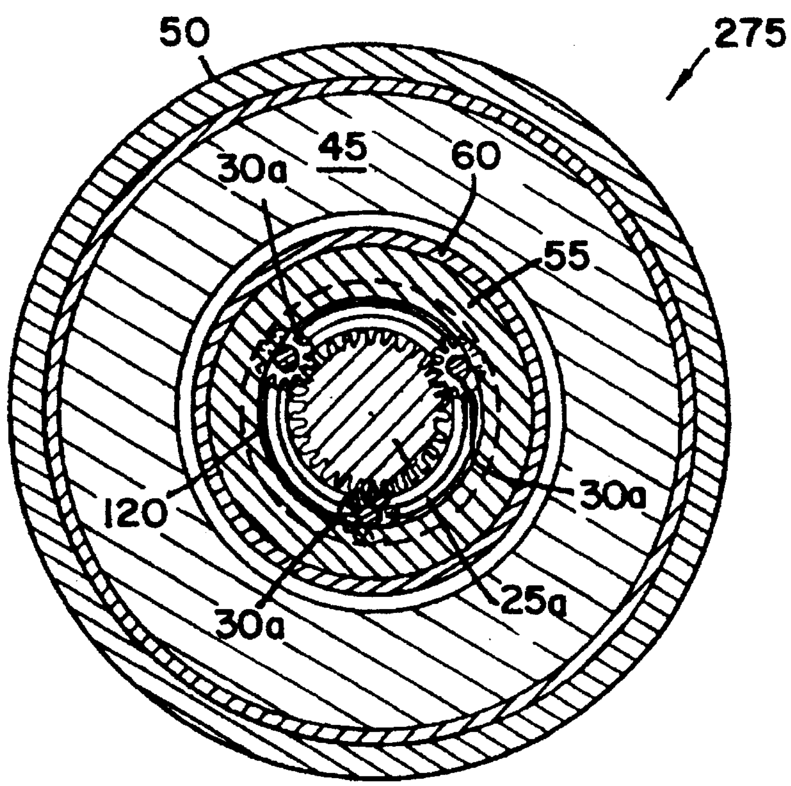
FIG. 5 is a sectional view as taken along lien 4—4 of FIG. 3.
Figure 6:
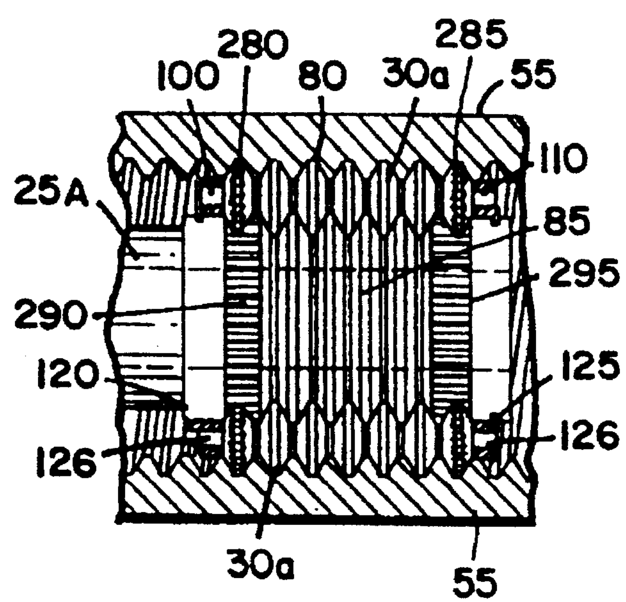
FIG. 6 is an enlarged detailed view of a portion of FIG. 4.

FIGS. 4–6 illustrate another preferred embodiment of a linear actuator 275 in accordance with the present invention. As shown, in FIGS. 4–6, the linear actuator 275 is similar to the linear actuator 20 of FIGS. 1–3 and has many of the same components. The reference numbers used in FIGS. 1–3 are used to identify like components in FIGS. 4–6. As shown in FIGS. 4–6, actuator 275 differs from the embodiment of FIGS. 1–3 in that the transmission rollers 30A of the actuator assembly include forward and rear gear teeth 280 and 285. Further, the output shaft 25A (about which the transmission rollers 30A are positioned) includes forward and rear gear teeth 290 and 295, respectively. The forward and rear gear teeth 280 and 285 of the transmission rollers 30A mesh with the respective forward and rear gear teeth 290 and 295 of the output shaft 25A to maintain the relative position of the rollers 30A while the output shaft 25A moves along the threaded bore 70 of the armature drive cylinder 55. The interaction of the gear teeth 280, 285 of the transmission rollers 30A and the gear teeth 290, 295 of the output shaft 25A prevents slippage therebetween.

Figure 7:
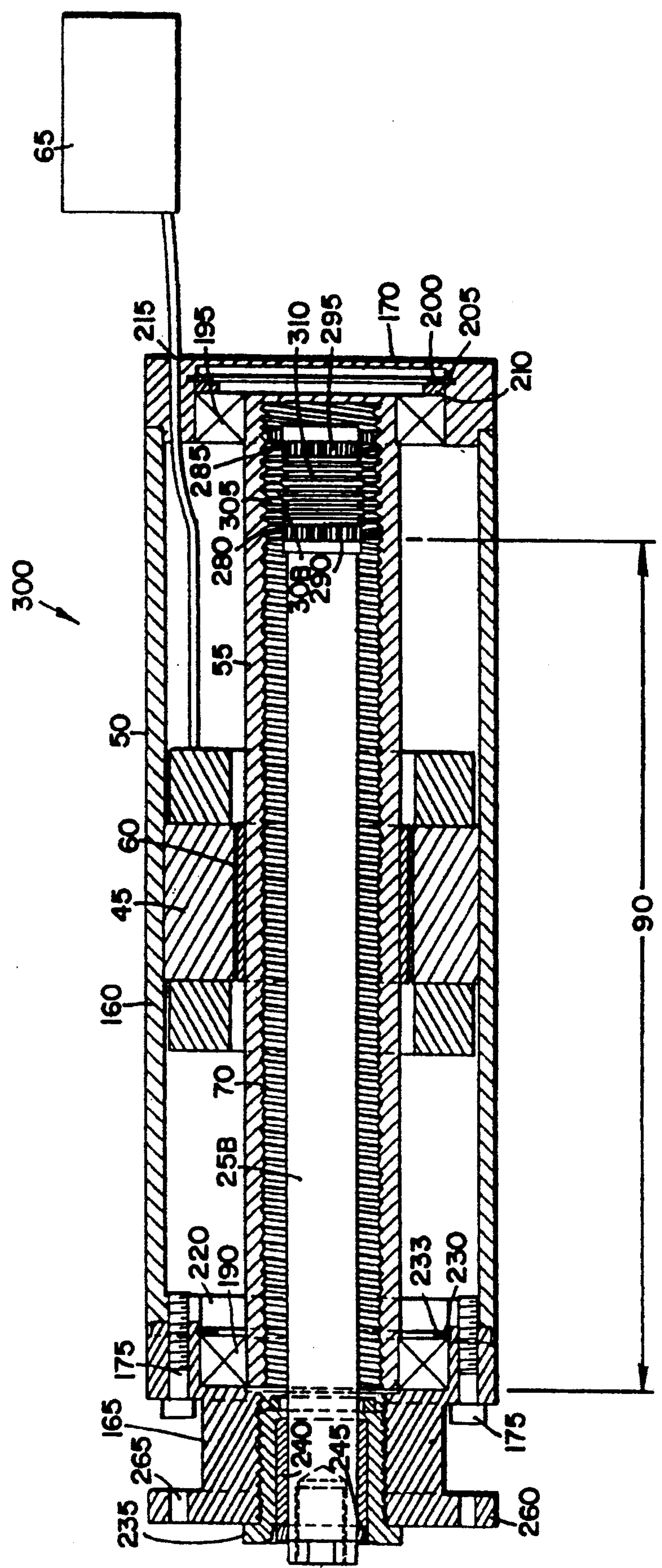
FIG. 7 is a sectional view along the axial length of a further embodiment of a linear actuator in accordance with the present invention.
Figure 8:
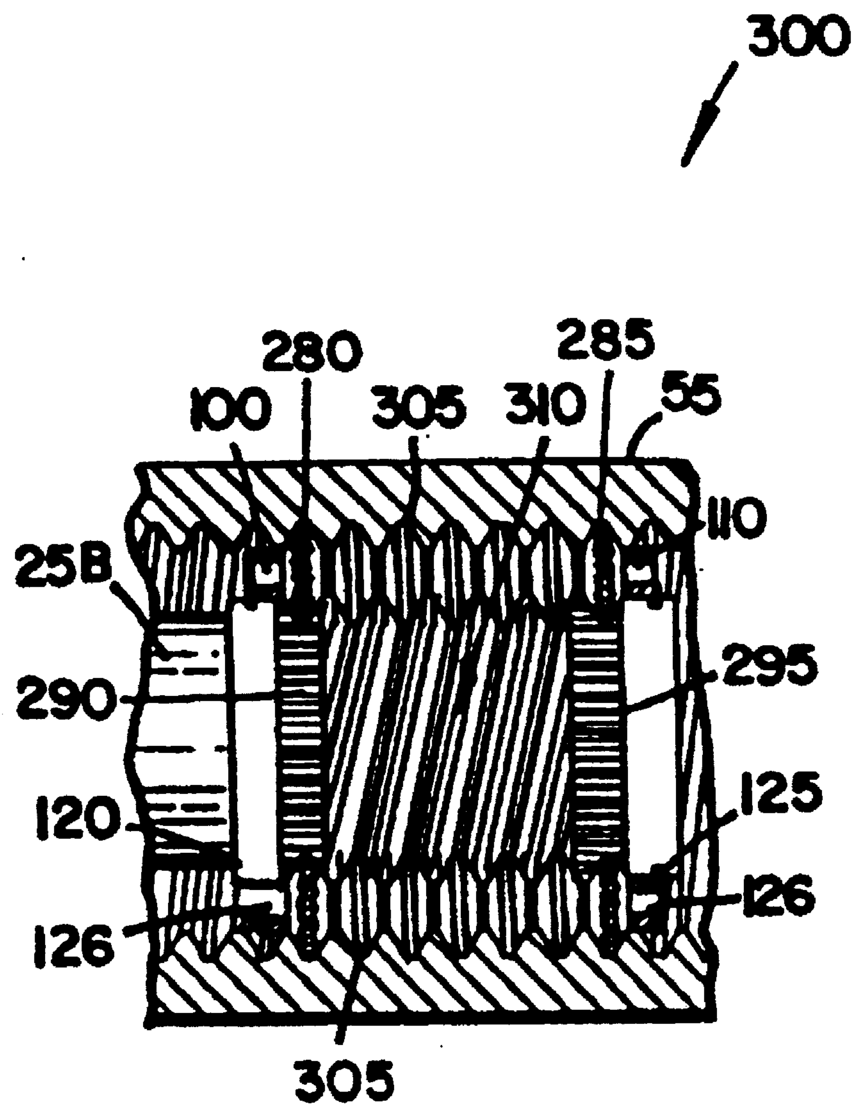
FIG. 8 is an enlarged detailed view of a portion of FIG. 7.

FIGS. 7 and 8 illustrate a further embodiment of a linear actuator 300 in accordance with the present invention. The linear actuator 300 is similar to linear actuator 275 (FIGS. 4–6) and, as such, like numbers have been used to identify like parts. However, in the linear actuator 300 of FIGS. 7 and 8, the camming surfaces of the transmission rollers 30B are defined by threads 305 instead of annular rings as shown in the first and second embodiments. Likewise, the portion of the output shaft 25B (about which the transmission rollers 30B are spaced) includes threads 310 instead of annular rings as in the embodiments of FIGS. 1–6 which are engaged by the threads 305 of the transmission rollers 30B. In operation, the threads of the bore 70 of the armature drive cylinder 55 engage the threads 305 of the transmission rollers 30B to move the transmission rollers 30B on rotation of the cylinder 55. The threads 305 of the transmission rollers 30B likewise engage the threads 310 of the output shaft 25B to correspondingly move the output shaft 25B in cooperation with the transmission rollers 30B.

Closed-Loop Feedback Controlled Linear Actuator

It will be appreciated by those skilled in the art that an objective of a closed-loop feedback controlled linear actuator is to precisely apply linear motion to some object or mechanism. The motion is generally programmed or defined in a computer program developed by the user of the actuator. For example, prior to using the actuator, the user enters the instructions and motion profiles into a programmable motion controller. The motion controller, when commanded, executes the user's program by signaling a servo amplifier to apply a voltage across the actuator's stator leads. The level of voltage applied is a function of the velocity specified in the user's program for the specific move being executed. The voltage causes current to flow in the stator windings of the actuator which, in turn, applies a torque to the motor armature. In an actuator assembly, the subsequent rotation of the armature is converted mechanically within the actuator to a linear motion reflected on the actuator's output shaft.

Specific instructions for both instantaneous position and velocity are transmitted by the motion controller for each move executed. In response, the amplifier applies a voltage level which represents an expected velocity output of the actuator. The expected voltage/velocity relationship is established by the user during setup and calibration of the system. It will be appreciated that for a number of reasons, the actual velocity of the output shaft seldom exactly matches what is being commanded by the motion controller. Thus, the actual movement of the actuator output shaft must be monitored to assure that the actuator produces the exact motion desired.

In the present invention, this is accomplished (1) by incorporating a velocity/position feedback sensor 510 within the actuator assembly 400 (best seen in FIG. 10) and (2) by designing the servo amplifier 507 and the controller 506 (best seen in FIG. 9) such that continuous adjustments are made to the voltage applied in response to any sensed error in position and/or velocity. By doing so, continual adjustment of the system command is accomplished such that the motion produced is exactly as intended by the user. For example, if the actuator's 400 output during a particular movement is 0.100 in. behind the target position at that moment and/or it is moving too slow relative to the instructions in the user program, then the voltage will be increased slightly to increase its speed (i.e., the controller 506 attempts to eliminate the gap between the target and actual values). This process of checking feedback and continuously correcting the command is commonly called closed-loop control.

In order to utilize closed-loop control, the controller 506 must receive information as to the velocity and the position of the actuator's 400 output shaft 25 at all times. A previous method of deriving this information was to utilize a linear position sensor. Such sensors exist in many forms and include potentiometers, LVDTs or magnostrictive types. While the accuracy of the feedback sensor may vary without affecting control, the velocity feedback must be continuous and linear with respect to the voltage applied in order for the system to operate correctly. Likewise, the relationship between the armature's movement and the sensed position must be continuous and linear for closed-loop to operate correctly. However, in any screw style rotary-to-linear conversion mechanism a small amount of backlash exists, introducing error in these systems.

Backlash results from the fact that no mechanism can be manufactured where all the components mesh or fit perfectly (i.e., tolerances are near or are zero). Even if the components could fit perfectly, and even assuming minimal wear, backlash would evolve. In the present case, it will be appreciated that backlash causes a non-linearity or discontinuity in the above described relationships at that point where the torque being applied to the armature changes direction.

Any discontinuity in these relationships will confuse the controller to the extent that instability or oscillation will occur. Therefore, the point at which the greatest precision and highest stability is normally desired is also exactly the point where instability will most likely occur. More specifically, the motor servo-controller must accurately hold the desired output shaft position by applying forward or reverse movement or force in response to any sensed movement from the desired position. However, due to the tolerances that backlash creates there is a discontinuity between the application of forward and reverse movement. As a result, the controller causes the linear actuator to hunt, or oscillate, back and forth in an attempt to maintain it in a final target position.

One approach to solving this problem is to eliminate backlash. This might be done by splitting one or more of the roller screw components in half, and then preloading the pieces against each other by an adjustable spring mechanism. If this approach is utilized, it will be appreciated that the spring tension must then exceed the actuator's load capacity.

However, such an approach is expensive and takes up additional space. Further, only half of the screw mechanism carries the load. While this approach can be made to work, the additional friction resulting from the high forces applied substantially reduces the system's efficiency—thereby increasing its power consumption thus reducing the life of the unit correspondingly.

Turning to the present invention, since the position and velocity of the output shaft 25 is a known fixed ratio of the rotation of the armature, the preferred solution is to measure its rotational position and velocity and allow the motion controller 506 to calculate the resulting position of the actuator's 400 output shaft 25. While backlash will allow some back and forth movement of the output shaft 25, when the armature is held in position, no discontinuity between the voltage applied to the armature and feedback will occur. Therefore, in the preferred embodiment, the feedback sensor 510 is mounted directly and rigidly to the armature resulting in stable operation. Using this method, the amount of backlash must only be less than the system accuracy requirements of the application (i.e., the inaccuracy allowed must be greater than the total backlash of the converting mechanism).

Figure 9:
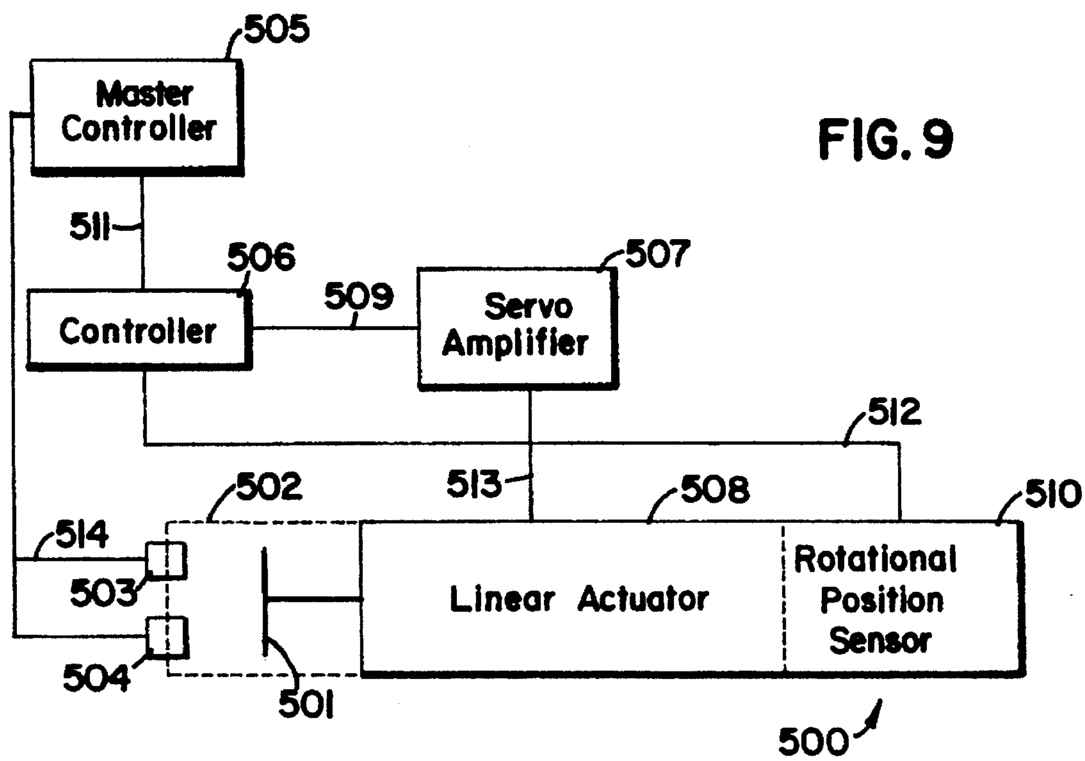
FIG. 9 is a functional block diagram of a preferred linear actuator including a feedback position sensor constructed according to the principles of the present invention (and illustrating a volumetric pump constructed according to the principles of the present invention).
Figure 10:
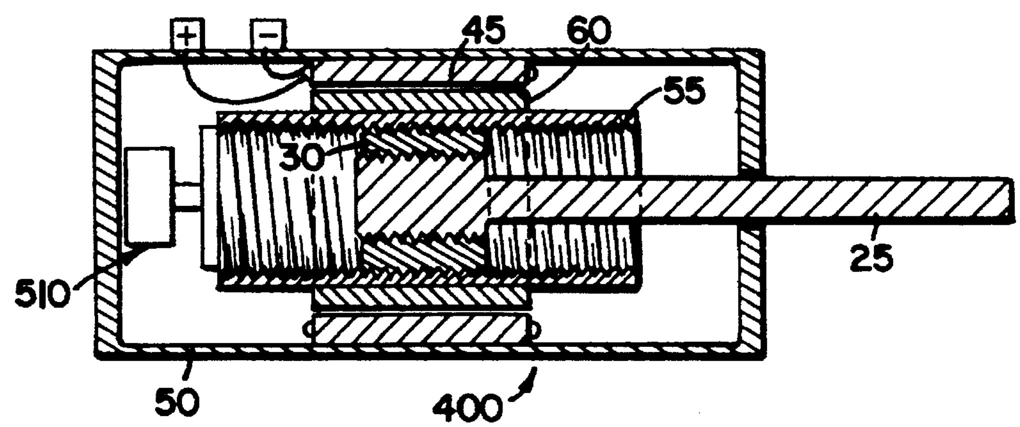
FIG. 10 is a sectional view taken along the axial length of a preferred embodiment linear actuator of FIG. 9.

In the preferred embodiment a rotary position/velocity sensor is used as illustrated in FIG. 9. Advantages associated with use of such a rotary feedback compared to a linear sensor device are that it is generally less expensive; it is more rugged; it does not require expensive boring of the output shaft; it mounts conveniently at the rear end of the armature; and it can be used to provide commutation signals required for brushless motors. Alternatively, employing a linear sensor would require the use of a separate motor commutation sensor.

It will be appreciated that the feedback loop normally includes some form of a proportional, integral, derivative control process equation. However, those skilled in the art will appreciate that other control equations, such as proportional, proportional-derivative, fuzzy logic, etc. and other types of control devices may also be used. For a more detailed discussion, reference may be had to Dorf, Modern Control Systems, pages 379 et. seq. (1981). Control equation constants for the preferred embodiment of the present system control, may be derived empirically, and may be changed depending upon the desired application. Additionally, those skilled in the art will appreciate that the constants may also be derived by determination of the transfer function from the steady-state response or other such methods as are well known in the art.

By using the servo-amplifier 507 and controller 506, the linear positioning of the output shaft 25 may be properly and quickly maintained for predetermined target locations. As seen in FIG. 9, closed-loop feedback control is established by the angular position control of the rotary sensor 510 which is provided to the controller 506. The controller 506 operates in accordance with its programmed position control profile and other programming steps, and provides signals to the servo amplifier 507. In turn, the servo amplifier 507 provides the required voltage to the linear actuator stator 45.

In the preferred embodiment, the rotary sensor is an optical digital encoder manufactured by Renco Corporation of California, under model designation RHS25D. Such devices generally operate by utilizing a light emitting device and a disk having a plurality of alternating optically transparent and opaque areas defined about the periphery. Thus, as the armature rotates, the light is alternatingly blocked and allowed to pass through the disk. A light sensitive device receives the light and provides a signal indicative of the light intensity received by the light sensitive device. It will be appreciated, however, that a light emitting device and a light receiving device together form an optical sensor, and that analog generators may also be utilized as part of the closed-loop feedback control loop.

Volumetric Pump

In a preferred application of the linear actuator, a volumetric pump may be designed. As seen in FIG. 9, a preferred volumetric pump constructed in accordance with the principles of the present invention includes a linear actuator as described above and further includes a cylinder head/piston 501 operatively disposed within a cylinder 502. The cylinder 502 includes two input/output ports. Valve devices 503, 504 are arranged and configured to operatively reside within the ports. These valve devices 503, 504 control the inflow and outflow of the fluid (and/or other materials) into and out of the pump.

In the preferred embodiment, the valves 503,504 are comprised of pneumatic valves which are operatively controlled by a master controller device 505. Master controller device 505 provides open and close signals to the valves 503 and 504 via signal path 514. Additionally, sensors (not shown) may be used to positively confirm the valves 503, 504 operation and/or the flow of fluid/materials to and from the pump. It will also be apparent to those skilled in the art that other valves, such as check valves and the like, may be utilized depending upon the application.

In the preferred embodiment, both cylinder head 501 and cylinder 502 are manufactured of stainless steel so as to resist corrosion and the like. It will be understood that other materials, such as various plastics, might be also be utilized. Although not shown, it will also be further understood that sealing means are operatively located between the cylinder head 501 and the cylinder 502. The sealing means are preferably comprised of a compliant sealing member made of rubber or plastic.

In operation, two strokes are defined by the linear actuator assembly 400 having a volumetric pump. The first stroke is an intake stroke which draws fluid/material to the pump from a supply (not shown). This stroke occurs when the output shaft is retracted. It should also be appreciated that the output valve 504 is closed during this stroke to avoid drawing material from the output of the pump. The second stroke is an exhaust stroke which moves material from the pump to a utilization point (not shown). This stroke occurs when the output shaft is extended. It should also be appreciated that the input valve 503 is closed during this stroke to avoid pumping material back to the supply.

Through use of the closed-loop feedback control described above, as well as timing the opening and closing of the pneumatic valves 503, 504 via master controller 505, the timing and programming of the entire system 500 may be controlled. For example, master controller 505 may provide instructions or interrupt signals to controller 506 via signal path 511. In turn controller 506 provides a velocity profile signal to the servo amplifier 507 via signal path 509. This signal is preferably a closed loop signal as discussed above (i.e., the signal includes an output signal generated from the desired position of the output shaft compared to the position of the output shaft determined by rotational position sensor 510). The servo amplifier 507 provides the proper voltage to the linear actuator via signal path 513. It will be appreciated by those skilled in the art that the controller 506 and servo amplifier 507 comprise the external controller 65 referenced above. The output signal of the rotational position sensor 510 is provided to the controller via signal path 512. In this manner, a precise delivery of fluid/materials is accomplished.

Although the present invention has been described with reference to preferred embodiments, workers skilled in the art will recognize that changes may be made in form and detail. For example, the output shaft "25" may be formed with rings or threads which directly engage the threads of the threaded bore 70 of the armature drive cylinder 55. Analog or digital sensors may be employed to detect the position of the output shaft, that information being used in control systems of known design. Also, other motor designs and types may be adapted to the practice of the present invention. These and other changes within the scope of the appended claims are anticipated by the present invention.

I claim:

1. An electrically powered linear actuator comprising:

(a) a housing assembly;

(b) an energizable stator supported by the housing assembly;

(c) elongated cylinder means of a magnetic material having means mounted about an outer circumference thereof for forming an armature with the cylinder means, the elongated cylinder means having an internally threaded bore to thereby define an armature drive cylinder;

(d) means for rotatably supporting the cylinder means relative to the housing assembly;

(e) an actuator assembly including an output shaft and a thread engaging portion operably coupled with the threaded bore of the cylinder means, the thread engaging portion being moved along the threaded bore of the cylinder means to provide bidirectional linear movement of the output shaft, the extent of the thread engaging portion being smaller than the extent of the internal threads extending along the cylinder means such that the difference therebetween defines a maximum actuation stroke for the actuator assembly, and the thread engaging portion including a plurality of transmission rollers interposed between and engaging both the output shaft and the threaded bore of the cylinder means; and (f) rotational position sensing means for sensing the rotational position of the armature drive cylinder and providing a positional signal representative thereof.

2. The actuator of claim 1, wherein:

(a) the plurality of transmission rollers are circumferentially spaced about a portion of the output shaft and axially aligned therewith, the rollers including camming surfaces, the internal threads of the cylinder means contacting the camming surfaces to move the transmission rollers along the threaded extent of the cylinder means in response to the selective rotation of the armature drive cylinder; and (b) the output shaft includes surfaces along a portion thereof which are engaged by the camming surfaces of the transmission rollers to cooperatively move the output shaft along the threaded extent of the cylinder means in combination with the transmission rollers, wherein the force transferred to the transmission rollers is directly transferred to the output shaft.

3. The actuator of claim 1, wherein the rotational sensing means comprises an optical encoder having an optical disk and an optical sensor, wherein the optical disk is operatively connected to the armature drive cylinder to rotate cooperatively therewith, the optical disk having alternating optically opaque and transparent portions disposed about its periphery, and wherein the optical sensor is arranged and configured with respect to the optical disk such that the optical sensor is capable of optically detecting incremental rotational movement of the optical disk by detecting the alternating optically opaque and transparent portions of the optical disk.

4. The actuator of claim 3, wherein the optical disk and the optical sensor are disposed within the housing assembly, and wherein the optical disk is rotatable coaxially with the armature drive cylinder.

5. The actuator of claim 1, wherein the rotational position sensing means comprises an analog generator.

6. An electrically powered volumetric pump, comprising:

(a) a cylinder having an input port and an output port;

(b) a piston disposed within the cylinder and slidable along a pumping axis; and (c) a linear actuator operatively connected to drive the piston in the cylinder, the linear actuator including:

(i) a housing assembly;

(ii) an energizable stator supported by the housing assembly;

(iii) elongated cylinder means of a magnetic material having means mounted about an outer circumference thereof for forming an armature with the cylinder means, the elongated cylinder means having an internally threaded bore to thereby define an armature drive cylinder;

iv) means for rotatably supporting the cylinder means relative to the housing assembly;

v) an actuator assembly including an output shaft operably coupled to the piston and a thread engaging portion operably coupled with the threaded bore of the cylinder means, the thread engaging portion being moved along the threaded bore of the cylinder means to provide bidirectional linear movement of the output shaft in an axis parallel to the pumping axis, the extent of the thread engaging portion being smaller than the extent of the internal threads extending along the cylinder means such that the difference therebetween defines a maximum actuation stroke for the actuator assembly, and the thread engaging portion including a plurality of transmission rollers interposed between and engaging both the output shaft and the threaded bore of the cylinder means; and (vi) rotational position sensing means for sensing the rotational position of the armature drive cylinder and providing a positional signal representative thereof.

7. The pump of claim 6, further comprising input and output valves configured to selectively allow fluid communication through the input and output ports, respectively, wherein when the linear actuator moves the piston in a first direction, flow is induced from the input port to the cylinder, and when the linear actuator moves the piston in a second direction, flow is induced from the cylinder to the output port.

8. The pump of claim 7, further comprising control means, operatively connected to the linear actuator and the input and output valves, for coordinating actuation of the linear actuator and the input and output valves, wherein the control means opens the input valve when the linear actuator is actuated to move the piston in the first direction and wherein the control means opens the output valve when the linear actuator is actuated to move the piston in the second direction.

9. The pump of claim 8, wherein the rotational sensing means comprises an optical encoder having an optical disk and an optical sensor, wherein the optical disk is operatively connected to the armature drive cylinder to rotate cooperatively therewith, the optical disk having alternating optically opaque and transparent portions disposed about its periphery, and wherein the optical sensor is arranged and configured with respect to the optical disk such that the optical sensor is capable of optically detecting incremental rotational movement of the optical disk by detecting the alternating optically opaque and transparent portions of the optical disk, and wherein the optical sensor is configured to provide the positional signal to the control means.

10. A method of controlling linear positioning in an electrically powered linear actuator of the type including an actuator assembly movable among a plurality of positions along a linear axis by an armature drive cylinder rotatably mounted within a housing having an energizable stator disposed about the armature drive cylinder, the actuator assembly including an output shaft coupled to the armature drive cylinder through a plurality of transmission rollers interposed therebetween, the method comprising the steps of:

(a) actuating an electrically powered linear actuator to rotate an armature drive cylinder disposed therein, including the step of transferring a force transferred to a plurality of transmission rollers by the armature drive cylinder directly to an output shaft;

(b) sensing the rotational position of the armature drive cylinder;

(c) determining a linear position of the actuator assembly from the sensed rotational position of the armature drive cylinder; and (d) terminating actuation of the electrically powered linear actuator when a desired linear position of the actuator assembly has been reached.

11. An electrically powered linear actuator comprising:

(a) a housing assembly;

(b) an energizable stator supported by the housing assembly;

(c) elongated cylinder means of a magnetic material having means mounted about an outer circumference thereof for forming an armature with the cylinder means, the elongated cylinder means having an internally threaded bore to thereby define an armature drive cylinder;

(d) means for rotatably supporting the cylinder means relative to the housing assembly;

(e) an actuator assembly including an output shaft and a thread engaging portion operably coupled with the threaded bore of the cylinder means, the thread engaging portion being moved along the threaded bore of the cylinder means to provide bidirectional linear movement of the output shaft, the extent of the thread engaging portion being smaller than the extent of the internal threads extending along the cylinder means such that the difference therebetween defines a maximum actuation stroke for the actuator assembly, wherein the thread engaging portion includes:

(1) a plurality of transmission rollers circumferentially spaced about a portion of the output shaft and axially aligned therewith, the rollers including camming surfaces, the internal threads of the cylinder means contacting the camming surfaces to move the transmission rollers along the threaded extent of the cylinder means in response to the selective rotation of the armature drive cylinder; and (2) surfaces along a portion of the output shaft which are engaged by the camming surfaces of the transmission rollers to cooperatively move the output shaft along the threaded extent of the cylinder means in combination with the transmission rollers, wherein the force transferred to the transmission rollers is directly transferred to the output shaft; and (f) rotational position sensing means for sensing the rotational position of the armature drive cylinder and providing a positional signal representative thereof.

12. The actuator of claim 11, wherein the rotational sensing means comprises an optical encoder having an optical disk and an optical sensor, wherein the optical disk is operatively connected to the armature drive cylinder to rotate cooperatively therewith, the optical disk having alternating optically opaque and transparent portions disposed about its periphery, and wherein the optical sensor is arranged and configured with respect to the optical disk such that the optical sensor is capable of optically detecting incremental rotational movement of the optical disk by detecting the alternating optically opaque and transparent portions of the optical disk.

13. The actuator of claim 12, wherein the optical disk and the optical sensor are disposed within the housing assembly, and wherein the optical disk is rotatable coaxially with the armature drive cylinder.

14. The actuator of claim 11, wherein the rotational position sensing means comprises an analog generator.

15. An electrically powered volumetric pump, comprising:

(a) a cylinder having an input port and an output port;

(b) a piston disposed within the cylinder and slidable along a pumping axis;

(c) a linear actuator operatively connected to drive the piston in the cylinder, the linear actuator including:

(i) a housing assembly;

(ii) an energizable stator supported by the housing assembly;

(iii) elongated cylinder means of a magnetic material having means mounted about an outer circumference thereof for forming an armature with the cylinder means, the elongated cylinder means having an internally threaded bore to thereby define an armature drive cylinder;

(iv) means for rotatably supporting the cylinder means relative to the housing assembly;

(v) an actuator assembly including an output shaft operably coupled to the piston and a thread engaging portion operably coupled with the threaded bore of the cylinder means, the thread engaging portion being moved along the threaded bore of the cylinder means to provide bidirectional linear movement of the output shaft in an axis parallel to the pumping axis, the extent of the thread engaging portion being smaller than the extent of the internal threads extending along the cylinder means such that the difference therebetween defines a maximum actuation stroke for the actuator assembly; and (vi) rotational position sensing means for sensing the rotational position of the armature drive cylinder and providing a positional signal representative thereof;

(d) input and output valves configured to selectively allow fluid communication through the input and output ports, respectively, wherein when the linear actuator moves the piston in a first direction, flow is induced from the input port to the cylinder, and when the linear actuator moves the piston in a second direction, flow is induced from the cylinder to the output port; and (e) control means, operatively connected to the linear actuator and the input and output valves, for coordinating actuation of the linear actuator and the input and output valves, wherein the control means opens the input valve when the linear actuator is actuated to move the piston in the first direction and wherein the control means opens the output valve when the linear actuator is actuated to move the piston in the second direction.

16. The pump of claim 15, wherein the rotational sensing means comprises an optical encoder having an optical disk and an optical sensor, wherein the optical disk is operatively connected to the armature drive cylinder to rotate cooperatively therewith, the optical disk having alternating optically opaque and transparent portions disposed about its periphery, and wherein the optical sensor is arranged and configured with respect to the optical disk such that the optical sensor is capable of optically detecting incremental rotational movement of the optical disk by detecting the alternating optically opaque and transparent portions of the optical disk, and wherein the optical sensor is configured to provide the positional signal to the control means.

* * * * *